US012386951B2

(12) United States Patent
Grover et al.

(10) Patent No.: US 12,386,951 B2
(45) Date of Patent: Aug. 12, 2025

(54) USING THREAD PATTERNS TO IDENTIFY ANOMALOUS BEHAVIOR

(71) Applicant: MICRO FOCUS LLC, Santa Clara, CA (US)

(72) Inventors: Douglas Max Grover, Rigby, ID (US); Michael F. Angelo, Houston, TX (US); Martin Fraser Arlitt, Calgary (CA)

(73) Assignee: Micro Focus LLC, Santa Clara, CA (US)

( * ) Notice: Subject to any disclaimer, the term of this patent is extended or adjusted under 35 U.S.C. 154(b) by 229 days.

(21) Appl. No.: 17/941,827

(22) Filed: Sep. 9, 2022

(65) Prior Publication Data
US 2024/0086522 A1 Mar. 14, 2024

(51) Int. Cl.
G06F 21/55 (2013.01)
G06F 9/455 (2018.01)

(52) U.S. Cl.
CPC ........ *G06F 21/552* (2013.01); *G06F 9/45558* (2013.01); *G06F 2009/45587* (2013.01); *G06F 2221/034* (2013.01)

(58) Field of Classification Search
CPC ............... G06F 21/552; G06F 9/45558; G06F 2009/45587; G06F 2221/034
See application file for complete search history.

(56) References Cited

U.S. PATENT DOCUMENTS

| | | | | |
|---|---|---|---|---|
| 8,667,471 | B2* | 3/2014 | Wintergerst | G06F 11/3612 717/124 |
| 8,677,360 | B2* | 3/2014 | de Justo Teixeira | G06F 11/3476 718/100 |
| 9,516,053 | B1* | 12/2016 | Muddu | G06F 16/9024 |
| 9,531,745 | B1* | 12/2016 | Sharma | G06F 40/205 |
| 9,824,209 | B1* | 11/2017 | Ismael | G06F 21/54 |
| 11,277,423 | B2* | 3/2022 | Brown | H04L 63/1416 |
| 11,416,612 | B2* | 8/2022 | Strogov | G06N 20/20 |
| 11,522,885 | B1* | 12/2022 | Maknickas | H04L 63/145 |
| 11,886,585 | B1* | 1/2024 | Davis | G06F 21/566 |
| 12,056,239 | B2* | 8/2024 | Grover | G06F 21/554 |
| 2008/0072238 | A1* | 3/2008 | Monnie | G06F 9/544 719/310 |
| 2012/0291033 | A1* | 11/2012 | de Justo Teixeira | G06F 11/3476 718/100 |
| 2017/0093897 | A1* | 3/2017 | Cochin | H04L 63/145 |
| 2017/0262387 | A1* | 9/2017 | Sell | G06F 12/0864 |
| 2018/0341494 | A1* | 11/2018 | Sood | G06F 9/3885 |
| 2019/0042745 | A1* | 2/2019 | Chen | G06V 20/62 |
| 2019/0207969 | A1* | 7/2019 | Brown | G06F 21/552 |
| 2021/0011730 | A1* | 1/2021 | Surti | G09G 5/393 |
| 2021/0064751 | A1* | 3/2021 | Li | G06F 18/2413 |
| 2021/0173930 | A1* | 6/2021 | Dahal | H04L 63/145 |

(Continued)

*Primary Examiner* — Jason Chiang
(74) *Attorney, Agent, or Firm* — Sheridan Ross P.C.

(57) ABSTRACT

Thread information generated by one or more computing systems is captured. A thread pattern is identified from the captured thread information. The thread pattern is compared to a learned thread pattern. An anomaly is identified in the thread pattern based on a variance from the learned thread pattern. In response to identifying the anomaly in the thread pattern, an action is taken based on the anomalous thread pattern. For example, a user may be notified. The thread patterns may be extended to compare between operating systems, hypervisors, containers, and/or virtual machines.

20 Claims, 8 Drawing Sheets

(56) References Cited

U.S. PATENT DOCUMENTS

| | | | |
|---|---|---|---|
| 2021/0286702 A1* | 9/2021 | Grover | G06F 11/364 |
| 2021/0334366 A1* | 10/2021 | Flach | G06F 21/64 |
| 2022/0058264 A1* | 2/2022 | Grover | G06N 20/00 |
| 2022/0084678 A1* | 3/2022 | Kelm | G06N 5/01 |
| 2022/0229901 A1* | 7/2022 | El Abed | G06F 21/554 |
| 2023/0016571 A1* | 1/2023 | Han | G06F 9/45558 |
| 2023/0061701 A1* | 3/2023 | Shih | G06F 9/547 |
| 2023/0289444 A1* | 9/2023 | Ermey | G06F 21/552 |

* cited by examiner

USING THREAD PATTERNS TO IDENTIFY ANOMALOUS BEHAVIOR

FIELD

The disclosure relates generally to anomaly detection and particularly to identifying anomalous behavior based on thread patterns.

BACKGROUND

Identification of malicious attacks and malware are an ongoing issue in computer networks/computer systems. As malicious attacks/malware evolve, identification of new types has always been difficult to detect. Typically, it may require multiple malware detection processes and techniques to identify a new type of malicious attack/malware.

SUMMARY

These and other needs are addressed by the various embodiments and configurations of the present disclosure. The present disclosure can provide a number of advantages depending on the particular configuration. These and other advantages will be apparent from the disclosure contained herein.

In one embodiment, thread information generated by one or more computing systems is captured. A thread pattern is identified from the captured thread information. The thread pattern is compared to a learned thread pattern. An anomaly is identified in the thread pattern based on a variance from the learned thread pattern. In response to identifying an anomaly in the thread pattern, an action is taken based on the anomalous thread pattern. For example, a user may be notified.

In another embodiment, first thread information generated by at least one of a first operating system, a first hypervisor, a first virtual machine, and a first container is captured. Second thread information generated by at least one of a second operating system, a second hypervisor, a second virtual machine, and a second container is captured. A first thread pattern based on the first thread information is created. A second thread pattern based on the second thread information is created. The first thread pattern is compared to the second thread pattern. An anomaly in the first thread pattern is identified based on a variance from the second thread pattern. In response to identifying the anomaly in the first thread pattern based on the variance from the second thread pattern, an action is taken.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
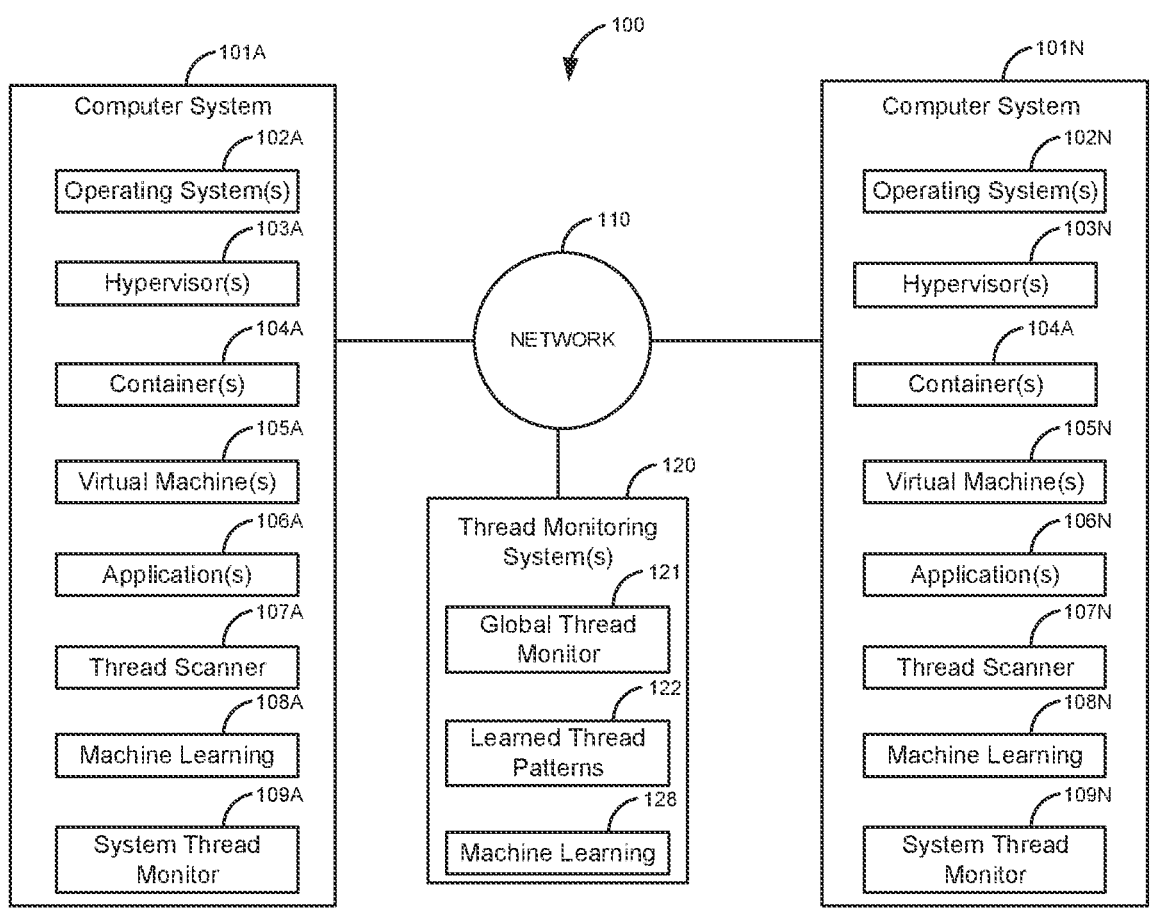
FIG. 1 is a block diagram of a first illustrative system for using thread patterns to identify anomalous user behavior.

FIG. 1 is a block diagram of a first illustrative system 100 for using thread patterns to identify anomalous user behavior. The first illustrative system 100 comprises computer systems 101A-101N, a network 110, and a thread monitoring system(s) 120.

The computer systems 101A-101N can be or may include any device that can communicate on the network 110, such as a Personal Computer (PC), a telephone, a video system, a cellular telephone, a Personal Digital Assistant (PDA), a tablet device, a notebook device, a smart phone, a server, a firewall, proxy server, an embedded device, and/or the like. As shown in FIG. 1, any number of computer systems 101A-101N may be connected to the network 110, including only a single communication system 101.

The computer systems 101A-101N further comprise operating system(s) 102A-102N, hypervisor(s) 103A-103N, virtual machines 105A-105N, application(s) 106A-106N, thread scanners 107A-107N, machine learning 108A-108N, and system thread monitors 109A-109N. The operating system(s) 102A-102N may comprise any known operating systems 102, such as, Microsoft Windows®, Linux®, Android®, iOS®, and/or the like.

The hypervisor(s) 103A-103N may be any know hypervisor 103, such as Kernel-Based Virtual Machine (KVM), Red Hat® Enterprise Virtualization, Xen/Citrix XenServer, Microsoft® Windows Server 2012 Hyper-V, VMware vSphere, and/or the like. The containers 104A-104N contain various application(s) 106A-106N that are executed by the operating system(s) 102A-102N.

The virtual machine(s) 105A-105N can be any known type of virtual machine 105. The virtual machines 105A-105N may run various application(s) 106.

The application(s) 106A-106N can be any type of application, such as, a web server, a financial application, a database, a word processing application, a network application, an embedded application (e.g., a printing application in a printer), an authentication service, a security application, and/or the like. The application(s) 106A-106N may be executed directly by the operating system(s) 102A-102N, may be executed in the container(s) 104A-104N, may be executed by the virtual machines 105A-105N, and/or the like.

The thread scanners 107A-107N can be any process/application that can capture thread information for the computer systems 101A-101N. The thread scanners 107A-107N may capture data in various ways, such as, using a thread dump, a thread capture program, a Java thread dump, using multi-device thread dumps, and/or the like.

The machine learning 108A-108N may comprise various types of machine learning, such as, supervised machine learning, semi-supervised machine learning, unsupervised machine learning, reinforcement learning, and/or the like. The machine learning 108A-108N is used to generate the learned thread patterns 122. The machine learning 108A-108N is used to learn over time how the thread patterns of the various components 102-106 are related and to learn variance tolerances. For example, variance tolerances may be timing between threads, how often specific threads occur, order of threads, and/or the like.

The system thread monitors 109A-109N use the machine learning 108A-108N to generate the learned thread patterns 122. The system thread monitors 109A-109N may work with the global thread monitor 121 to monitor thread patterns of all the computer systems 101A-101N on the network 110. In one embodiment, the system thread monitors 109A-109N may be self-contained and not work with the thread monitoring system 120($s$)/global thread monitor 121. Although not shown in FIG. 1, the learned thread patterns 122 may be stored locally on the computer systems 101A-101N.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The thread monitoring system(s) 120 is used to capture global thread information from the computer systems 101A-101N. The thread monitoring system(s) 120 comprises the global thread monitor 121, the learned thread patterns 122, and machine learning 128. The global thread monitor 121 may capture thread information received from the system thread monitors 109A-109N to create the learned thread patterns 122 using the machine learning 128.

For a large organization there may be many independent instances of the thread monitoring system 120. In one embodiment, there could also be a hierarchy of thread monitoring systems 120, that share aggregated information (e.g., statistics about different thread patterns seen in a local thread monitoring area/network 110); this allows for a global management console where one could check if an unexpected thread pattern is seen in one monitoring area/network 110 has been seen/not seen in other areas before.

The thread monitoring systems 120 at a higher level in the hierarchy may not possess the thread patterns from their leaf nodes (e.g., the system thread monitors 109), but rather summaries of the thread patterns that have been encountered at different leaves (or sub-leaves). One scalable approach would be to use Bloom Filters i.e., each thread monitoring system at the leaf (lowest) level of the hierarchy could summarize the thread patterns it observed over the last observation period, and then record that in a Bloom Filter. It could also build statistical summaries of the thread patterns seen over the past observation period and send those to its parent. At the parent one could analyze the statistics for anomalies. One could also monitor for the spread of anomalous patterns over time. The Bloom Filters may make such a check more efficient to do across a large number of monitored servers.

In another embodiment, the thread monitoring systems 120 may run in a peer-to-peer application. Similar to the hierarchical system, the organization's thread monitoring systems 120 may be broken into groups, cells, and/or the like. Summary information could be shared between the groups via a peer-to-peer protocol so that groups learn about patterns for other groups and can leverage that information to decide if some new patterns are anomalous. A benefit of using a number of small groups is that there is a higher probability of a local administrator knowing what is "normal" for systems they administer, so labeling of patterns can be determined more easily. This can be used in a collaborative environment of where a group of enterprises (e.g., different corporations) could cooperate with each other to sharer thread information.

The learned thread patterns 122 may be thread patterns of the computer systems 101A-101N, may be a composite of the learned thread patterns 122 of the computer system 101A-101N, and/or the like. For example, a composite learned thread pattern 122 may comprise thread patterns of a client/server application 106 or applications 106 that interact with each other. A composite learned thread pattern 122 may be thread pattern of two or more of the components 102-106 along with other components (e.g., shared libraries)/computer systems 101A-101N/devices.

The machine learning 128 may be the same type of machine learning 128 as the machine learning 108A-108N. Alternatively, the machine learning 128 may be different from the machine learning 108A-108N. The machine learning 128 may also identify composite thread variances.

Figure 2:
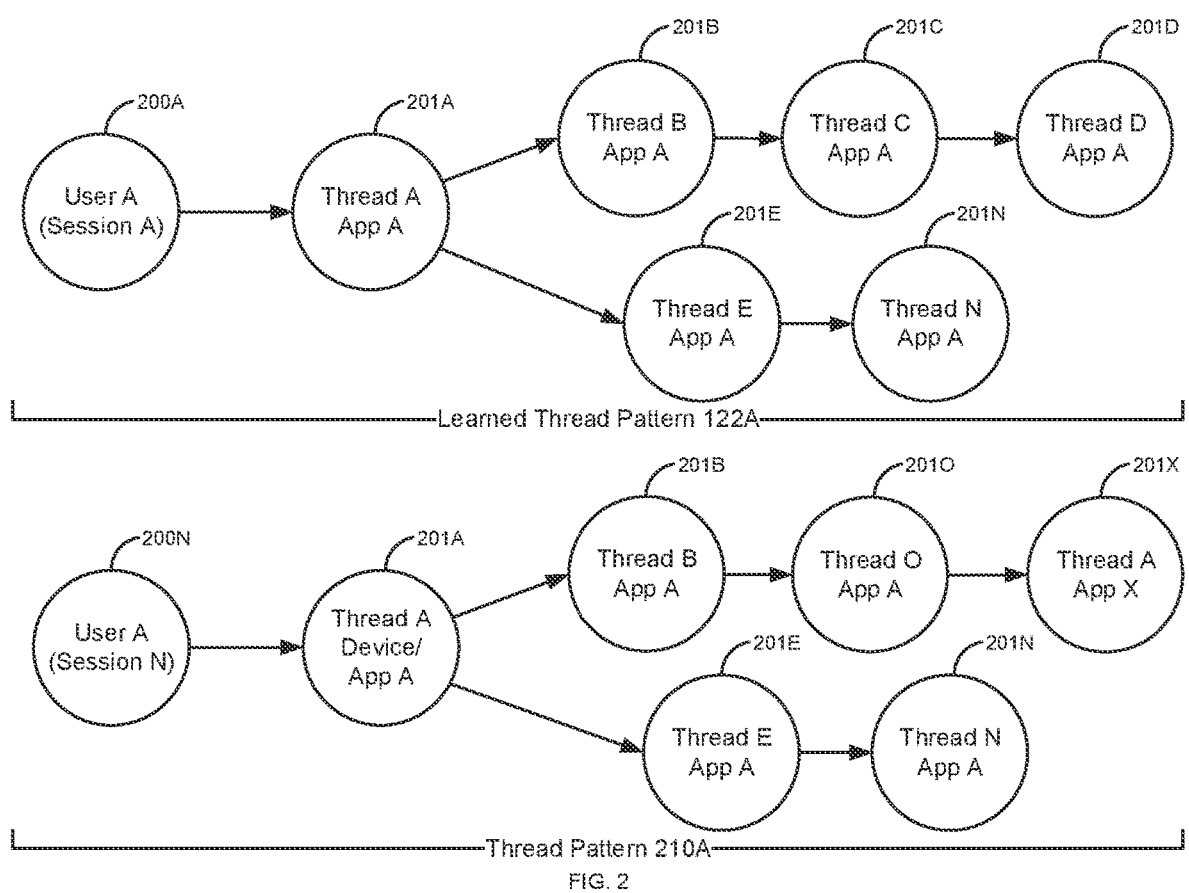
FIG. 2 is a block diagram of a thread pattern and a learned thread pattern that compares threads of a user accessing an application.

FIG. 2 is a block diagram of a thread pattern 210A and a learned thread pattern 122A that compares threads of a user accessing an application 106. The learned thread pattern 122A is a learned thread pattern 122 based on the machine learning 108/128. The learned thread pattern 122A is a thread pattern of how a user is accessing the application 106A that is learned by the machine learning 108/128 over time. For example, the machine learning 108/128 may be a supervised machine learning process. The learned thread pattern 122A comprises a user session node 200A and threads 201A-201N.

The thread pattern 210A is a current thread pattern of how a user is accessing the application 106A. The thread pattern 210A comprises a user session node 200N and threads 201A-201B, 201E, 201N, 201O, and 201X.

The thread pattern 210A for session N is compared to the learned thread pattern 122A (e.g., learned from sessions A-M) to identify any potential variances. For example, as shown in FIG. 2, in session N, instead of thread 201C being created by thread 201B, thread 201O is created, which in turn, launches thread 201X for application X (e.g., a virus). This can be flagged as an anomaly and potential use of malware.

FIG. 2 is an example of where the learned thread patterns 122/thread patterns 210 are tracked using a Graph Neural Network (GNN). In the GNN, the user sessions 200/threads 201 are nodes. The links between each node 200/201 may have associated information. For example, the link from the user session nodes 200A/200N may have a username, a login time, and/or the like. The links for the threads 201 may have information such as, function calls where the thread 201 was created, stack size when the thread 201 was created/ended, a heap size of when the thread 201 was created/ended, memory usage while the thread 201 was active, timestamps/time periods of threads 201, resource loads, other concurrently running applications 106, and/or the like.

The node/link information may also be used when comparing the thread pattern 210A to the learned thread pattern 122A to identify variances. The comparison may use thresholds when identifying a malicious thread pattern based on one or more of these factors. For example, if the memory usage is dramatically different for a thread 201 of the thread pattern 210A versus the learned thread pattern 122A, this may indicate a malicious behavior or some other issue with the thread 201/application 106.

Figure 3:
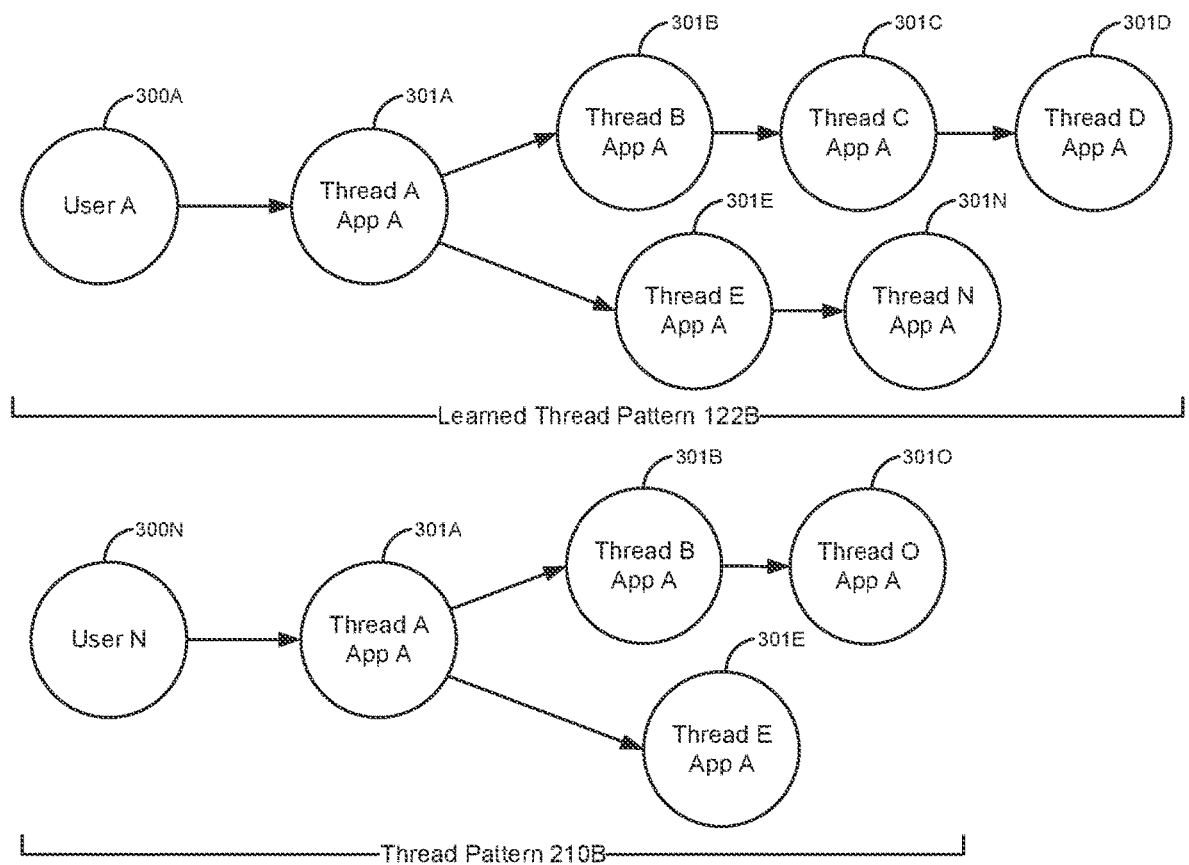
FIG. 3 is a block diagram of a thread pattern and a learned thread pattern that compares threads of different users accessing an application.

FIG. 3 is a block diagram of a thread pattern 210B and a learned thread pattern 122B that compares threads 201 of different users accessing an application 106. In FIG. 3 the learned thread pattern 122B comprises user node 300A and threads 301A-301N. The thread pattern 210B comprises user node 300N, threads 301A-301B, 301E, and 301O.

The application 106 may be the same application 106 or different instances of the same application 106. For example, if there are 100 users, and 99 of the 100 users have similar learned thread patterns 122 (or groups of learned thread patterns 122), the thread pattern 210B for user N can be flagged as a potentially anomalous thread pattern because thread 301B creates thread 301O instead of threads 301C/301D. The users may be a group of users who are part of a group that perform similar functions. For example, the group may be software engineers of project X, network analysts for company Y, engineering managers for company Z, and/or the like. The users may be on different devices or the same device (e.g., a server). This process can be applied to web servers where a thread is spun off when a user accesses the web server.

In one embodiment, where unsupervised machine learning is used, the process can look for patterns that are different from the others. In this embodiment, it doesn't require comparison to a known good baseline pattern.

The process can be used to detect a group attack. For example, if a group of users suddenly started having similar anomalous thread patterns 210 versus the learned thread pattern 122 for the group, this may indicate a group attack or where a group of users/bots are working on concert to perform a malicious activity.

Figure 4:
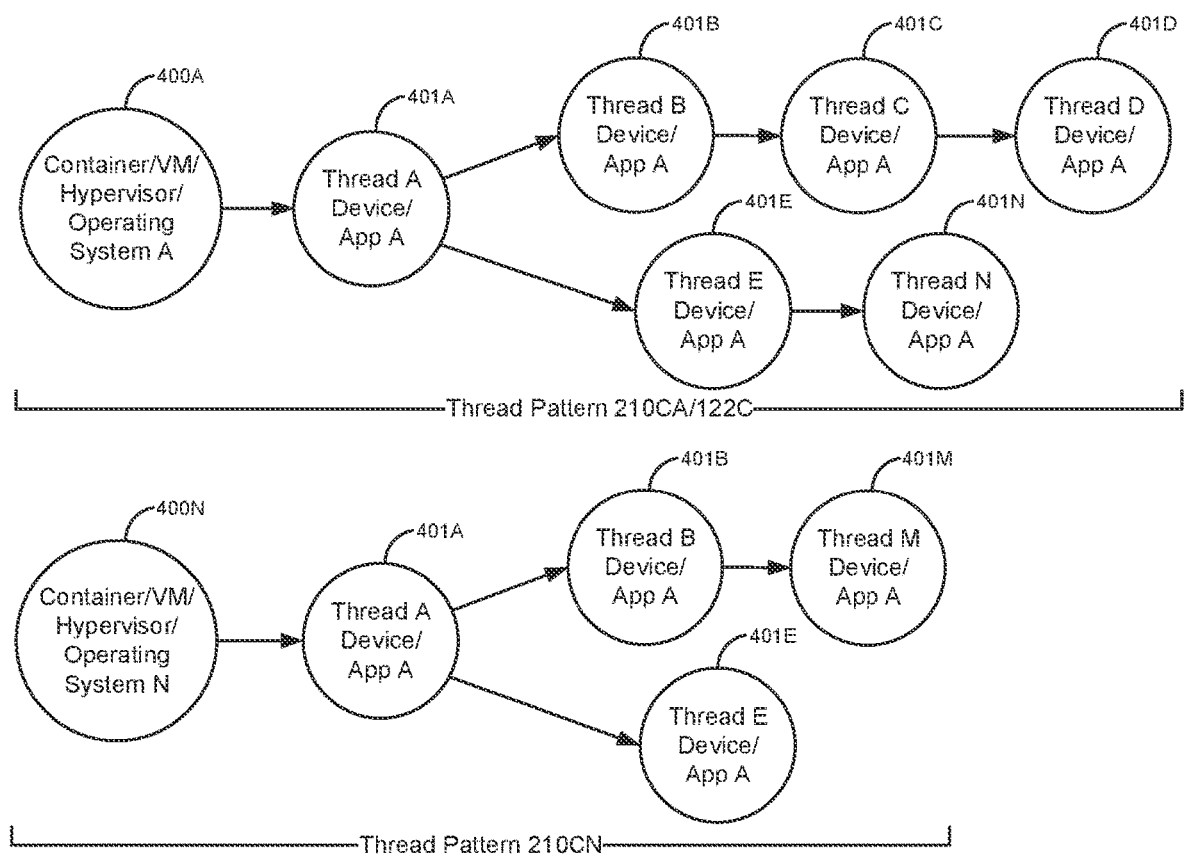
FIG. 4 is a block diagram of a thread pattern and a learned thread pattern that compares threads between operating systems, hypervisors, containers, virtual machines, and/or applications.

FIG. 4 is a block diagram of a thread pattern 210CN and a learned thread pattern 122C that compares threads 401 between operating systems 102, hypervisors 103, containers 104, virtual machines 105, and/or applications 106. FIG. 4 comprises thread pattern 210CA (a real-time thread pattern) or the leaned thread pattern 122C to thread pattern 210CN (a real-time thread pattern). The thread pattern 210CA/leaned thread pattern 122C comprises a container/VM (virtual machine)/hypervisor/operating system node 400A, and thread nodes 401A-401N. The thread pattern 210CN comprises a container/VM (virtual machine)/hypervisor/operating system node 400N and threads 401A-401B, 401E, and 401M.

Instead of comparing at a user level (although it could also be extended to the user level as well) like described in FIGS. 2-3, the process of FIG. 4 compares at an operating system level, a hypervisor level, a virtual machine level, a container level, and/or the like. For example, a cloud service may provide for multiple tenants where each tenant's application 106 is provided in a separate container 104 or virtual machine 105.

The operating system 102/hypervisor 103/container 104/virtual machine 105 thread patterns 210A/210N may be compared to each other in real-time/semi-real time, within time periods, against previous thread patterns of the same component 102-106, and/or the like. In one embodiment, a learned thread pattern 122C may be used to compare against the thread pattern 210CN. For example, if the hypervisor 103A's/container 104A's learned thread pattern 122C varies from the hypervisor 103N's/container 104N's thread pattern 210CN, it would be flagged as a potential anomaly.

In FIG. 4, the variance is that instead of thread 401B creating threads 401C/401D as shown in the thread pattern 210CA/learned thread pattern 122C, the thread 401M is created. Also, thread 401N is not created in the thread pattern 210CN. In this example, there are multiple variances.

The thread patterns 210/learned thread patterns 122 may be a composite thread pattern. For example, the thread patterns 210/learned thread patterns 122 may be across an operating system 102/hypervisor 103, and the corresponding containers 104 that are being run by the hypervisor 103. The process can learn thread patterns 122 of how a hypervisor 103 creates a container 104 and then the threads that are run in the container 104. In one embodiment, the thread pattern may be a tree GNN where the root is the operating system 102/hypervisor 103 and the branches are the threads of each container 104 instantiated by the hypervisor 103. The tree GNN could further include individual user thread patterns of the container 104 to provide a composite view. This can be extended even further to include applications 106 that are running in each of the containers 104.

The thread patterns 210/122 may be across multiple containers 104/virtual machines 105. For example, a thread in container 104 may instantiate a new container 104 or access a process in another container 104. An example would be an authentication micro service in a first container 104 that instantiates or allows access to a second container 104 once a user logs in. In this example, the thread pattern 210/122 would include those in the authentication micro service container 104 and then those in the second container 104 as a single user thread pattern 210/122.

The user/operating system 102/hypervisor 103/container 104/virtual machine 105 thread patterns may be monitored for common unusual changes that may indicate some type of group attack or Denial-of-Service (DoS) attack. For example, a DoS attack may be detected where there are new user threads 401 that all have the same pattern where typically a user pattern has a learned variance that is different. In this case, there is a large group of identical threads that would be identified and the anomaly/variance.

Figure 5:
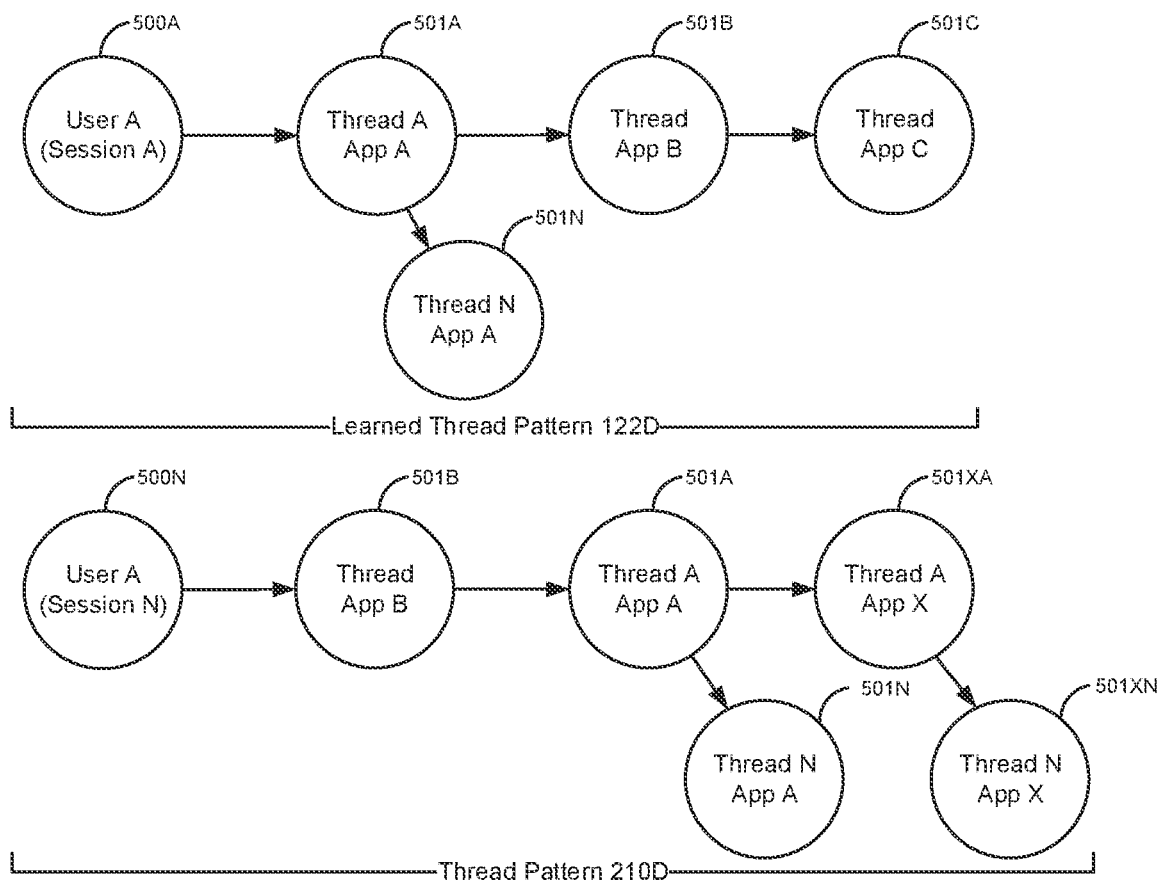
FIG. 5 is a block diagram of a thread pattern and a learned thread pattern that compares threads of user sessions.

FIG. 5 is a block diagram of a thread pattern 210D and a learned thread pattern 122D that compares threads of user sessions. FIG. 5 comprises learned thread pattern 122D and thread pattern 210D. The learned thread pattern 122D comprises a session node 500A, and threads 501A-501N. The thread pattern 210D comprises session node 500N and threads 501A-501B, 501N, 501XA, and 501XN.

The thread patterns 210D/122D are based on a user session. For example, a user logs into their personal computer 101 and then accesses various applications 106, executes various commands (e.g., shell scripts), and/or the like. Although shown for various applications 106, the process of FIG. 5 may apply to the container level, the virtual machine level, the hypervisor level, the operating system level, and/or the like.

As the user does various activities that generates threads 501, such as, logging in, launching an application 106, entering command line commands, this information is captured in the learned thread pattern 122D. The learned thread pattern 122D may also comprise concurrent threads/non-concurrent threads. The anomalies may be at the application level where groups of application-level threads are captured and stored off for comparison. For example, even though for session N, where the thread for the application 106B comes before the threads for the application 106A, based on rules/learning, this would not likely be considered an anomaly because the thread patterns for applications 106A/106B are similar. The difference is that the threads 501A/501N/501B for applications 106A and 106B are transposed (this may also be learned over time). However, the threads for application X (501XA and 501XN) would be considered an anomaly because application X has never been used previously by user A. In other words, there may be different rules/learned rules for different types of anomalies/variances and the threshold required to trigger a potentially anomalous event. Other patterns may be where a thread 501 is left running after the user logs out where this did not happen previously. Other factors may include the time a thread is active.

In another embodiment, which would be useful in the situation where there are thread monitoring systems 120 distributed around an organization, only one person needs to investigate the anomaly and label it, then all other thread monitoring systems could benefit from that label. The point of this is to try and either reduce false positives or to reduce the number of unknown activities/thread patterns detected.

The user thread patterns 210D/learned thread patterns 122D may be across different devices (e.g., computer systems 101A-101N). For example, a user may login to computer system 101A and then do a remote login to computer system 101B from computer system 10A. These two thread patterns may be combined into a composite thread pattern between the two computer systems 101A/101B (e.g., a user has compromised computer system 101A and is now trying to compromise the computer system 101B). The composite thread pattern may be analyzed for anomalies. The thread pattern would be different if the user logged into computer system 101A and computer system 101B separately because there is a relationship between the computer system 101A/101B because of the remote login which would be indicated by the GNN.

Any of the above processes may be combined. For example, individual user threads may be compared between containers 104/virtual machines 105. The detection of threads can be accomplished at the kernel level using a daemon.

The thread pattern comparison may consider a context. For example, the learned thread patterns 122 where a user is logged on remotely versus locally may be different. Other context factors may be location, time of day, access device, IP address, login level/role (e.g., accessing different functionality of an application 106 based on login level/role) and/or the like.

This process could use a learned thread pattern repository that can be accessed by different entities. For example, the learned thread patterns 122 for application 106A in company A may be uploaded to a central repository for use another company/entity who is also using application 106A. The machine learning process in the central repository can then be used to identify learned thread patterns 122 more quickly.

Figure 6:
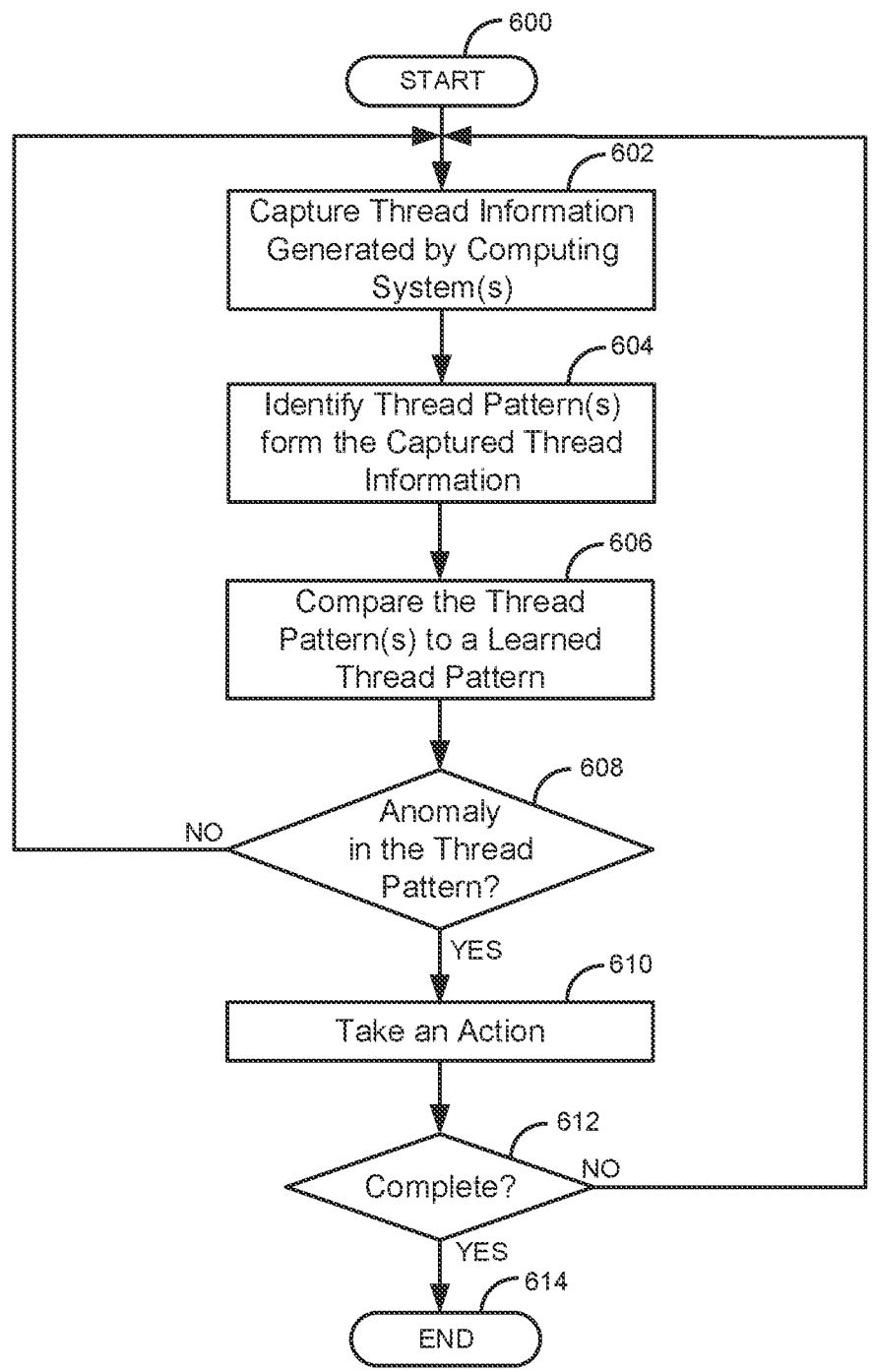
FIG. 6 is a flow diagram of a process for using thread patterns to identify anomalous user behavior.
Figure 7:
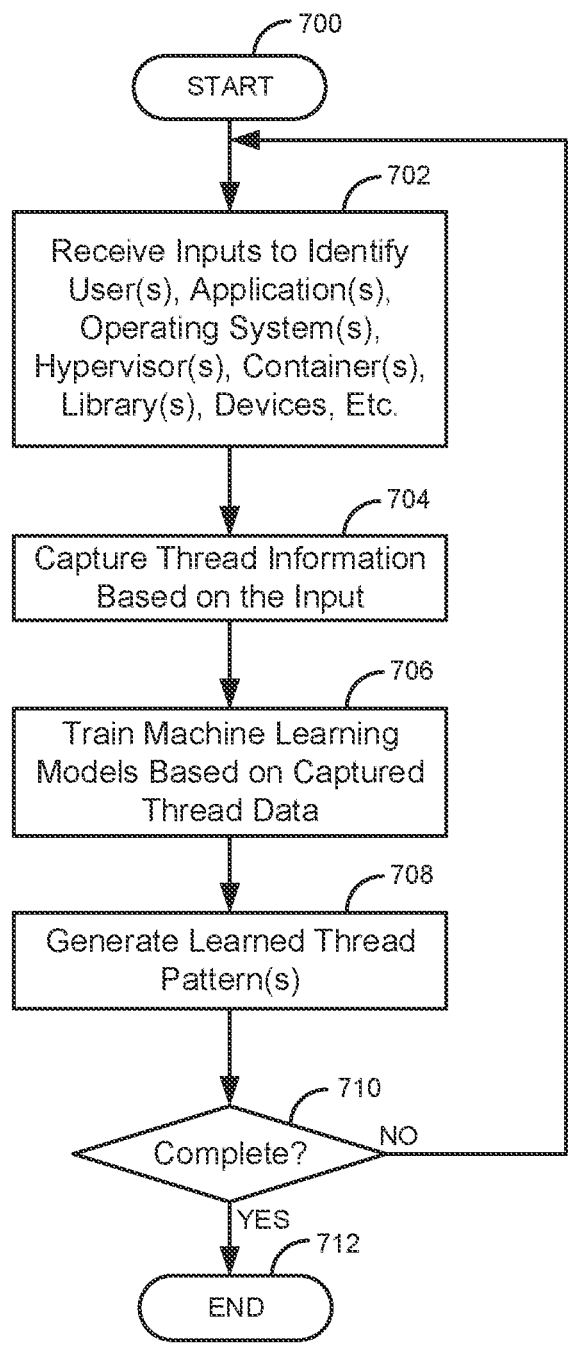
FIG. 7 is a flow diagram of a process for generating learned thread pattern(s) based on machine learning.
Figure 8:
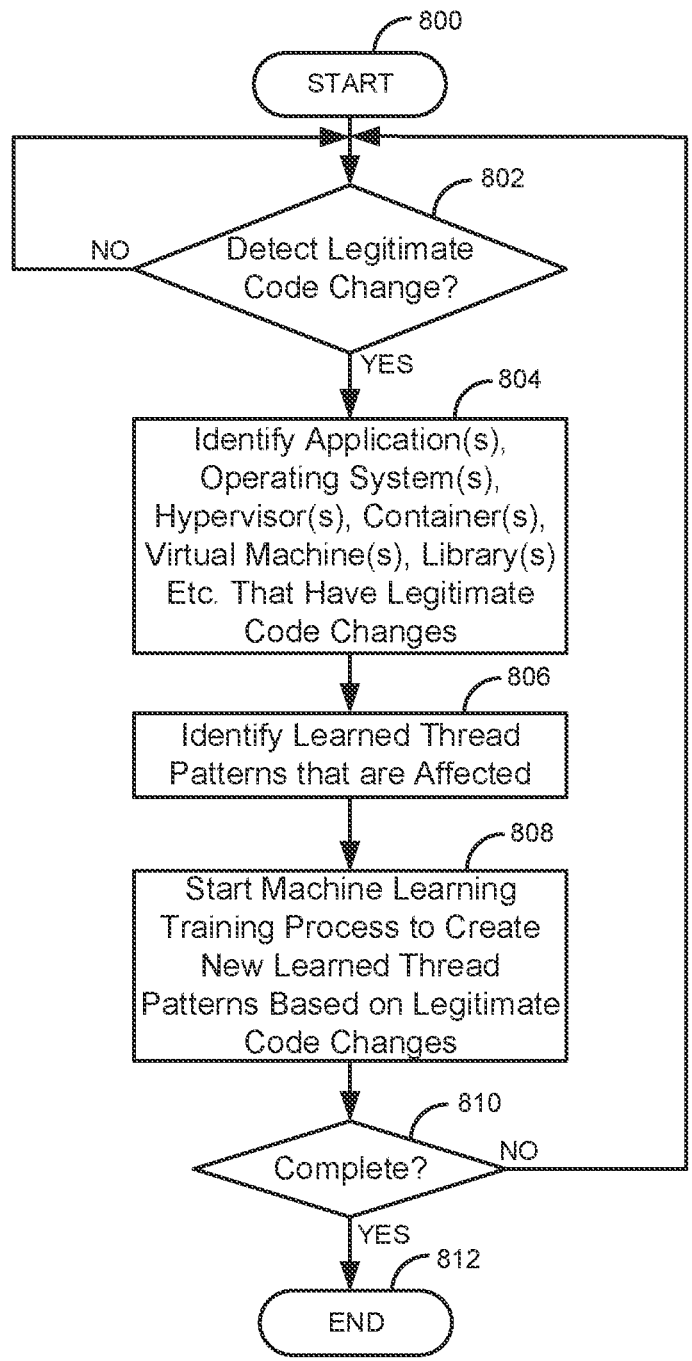
FIG. 8 is a flow diagram of a process for detecting code changes to regenerate learned thread patterns.

FIG. 6 is a flow diagram of a process for using thread patterns 122/210 to identify anomalous user behavior. Illustratively, the computer systems 101A-101N, the operating system(s) 102A-102N, the hypervisor(s) 103A-103N, the container(s) 104A-104N, the virtual machine(s) 105A-105N, the application(s) 106A-106N, the thread scanners 107A-107N, the machine learning 108A-108N, the system thread monitors 109A-109N, the thread monitoring system 120(s), the global thread monitor 121, and the machine learning 128 are stored-program-controlled entities, such as a computer or microprocessor, which performs the method of FIGS. 6-8 and the processes described herein by executing program instructions stored in a computer readable storage medium, such as a memory (i.e., a computer memory, a hard disk, and/or the like). Although the methods described in FIGS. 6-8 are shown in a specific order, one of skill in the art would recognize that the steps in FIGS. 6-8 may be implemented in different orders and/or be implemented in a multi-threaded environment. Moreover, various steps may be omitted or added based on implementation.

The process starts in step 600. The thread scanner(s) 107 capture, in step 602, thread information generated by the computer system(s) 101. The thread capture of step 602 may be based on one or more rules. The thread monitor(s) 109 and/or the global thread monitor 121 identify the thread patterns 210 from the captured thread information in step 604. The thread monitor(s) 109 and/or the global thread monitor 121 compare the thread pattern(s) 210 to the learned thread pattern 122 in step 606. The comparison could also be between real-time thread patterns. The thread monitor(s) 104 and/or the global thread monitor 121 determine, in step 608, if there is an anomaly/variance. If there is not an anomaly/variance in step 608, the process goes back to step 602.

Otherwise, if there is an anomaly/variance in step 608, the thread monitor(s) 109 and/or the global thread monitor 121 take an action in step 610. The action may be any action related to the anomaly/variance. For example, the action may be blocking one or more threads, notify a user, shutting down a container 104, shutting down an application 106, shutting down a virtual machine 105, quarantining an application 106, blocking a thread, restricting resources (e.g., limiting memory, limiting CPU cycles give to an application 106, etc.), and/or the like.

The process determines, in step 612, if the process is complete. If the process is not complete in step 612, the process goes back to step 602. Otherwise, the process ends in step 614.

FIG. 7 is a flow diagram of a process for generating learned thread pattern(s) 122 based on machine learning 108/128. The process starts in step 700. The thread scanner(s) 107 receive inputs to identify user(s), application(s) 106, operating system(s) 102, hypervisor(s) 103, container(s) 104, library(s), computer system(s) 101, device(s), etc. The input of step 702 is used to determine which thread information to capture and what thread patterns 210/learned thread patterns 122 to capture/compare. The thread scanner(s) 107 capture the thread information based on the input in step 704. The thread information is input into the machine learning 108/128, in step 706, to train the machine learning algorithms. The learned thread patterns 122 are then generated in step 708.

The process determines, in step 710, if the process is complete. If the process is not complete in step 710, the process goes back to step 702. Otherwise, the process ends in step 712.

FIG. 8 is a flow diagram of a process for detecting code changes to regenerate learned thread patterns 122. The process starts in step 800. The system thread monitor(s) 109 detect if there are any legitimate code changes in step 802. Step 802 may differentiate between legitimate code changes and illegitimate code changes. For example, legitimate code changes may be made based on an administered patch and/or installation. This may include a search for any kinds of malware before the installation. If a legitimate code change is not detected in step 802, the process of step 802 repeats.

Otherwise, if a legitimate code change is detected in step 802, the system thread monitor(s) 109 identify any application(s) 106, operating system(s) 102, hypervisors 103, container(s) 104, virtual machine(s) 105, libraries, etc. that have legitimate code changes in step 804. The system thread monitor(s) 109/global thread monitor 121 identify the learned thread patterns 122 that are affected in step 806. The system thread monitor(s) 109/global thread monitor 121 restart the machine learning training process to create new learned thread patterns 122 based on the legitimate code changes in step 808.

The process determines, in step 810, if the process is complete. If the process is not complete in step 810, the process goes back to step 802. Otherwise, the process ends in step 812.

In an embodiment that is designed to address the problem of false positives (i.e., too many actions to take), a risk scoring model is designed that takes advantage of context about the monitored computer systems 101A-101N and the statistics generated about the thread patterns. For instance, a never-before-seen thread pattern from a popular application is likely a higher priority issue than a seldomly-seen thread pattern from an unpopular application.

To make the system more scalable, the global thread monitor 121 may break the thread activity into fixed "chain lengths" (e.g., FIG. 2 shows a chain length of 4 on the top: A→B→C→D), then give each of those a unique identifier and repeat the process. E.g., for chain link 4, A→B→C→D→A→B→C→D would be broken into A→B→C→D and A→B→C→D. if a="A→B→C→D" then the chain could be summarized as a+a.

In this embodiment, the summary statistics could be kept on individual computer systems 101A-101N or in hierarchical nodes. For example, over a time window W count the number of occurrences of each computer system 101A-101N or chain. The summary could be passed up the hierarchy so that probability distributions could be calculated, then when something is deemed an anomaly by other means, check the probability distribution to see how rare it is.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
capture thread information generated by one or more computing systems;
identify a thread pattern from the captured thread information;
compare the thread pattern to a learned thread pattern comprising comparing a user session thread pattern of a first user using a plurality of applications to a learned session thread pattern of the first user using the plurality of applications and wherein machine learning is used to filter out variances that have a similar usage pattern, but in a different order;
identify an anomaly in the thread pattern based on a variance from the learned thread pattern; and
in response to identifying the anomaly in the thread pattern, take an action based on the anomaly in the thread pattern.

2. The system of claim 1, wherein comparing the thread pattern to the learned thread pattern comprises at least one of:
comparing a thread pattern of the first user using a first application to a learned thread pattern of the first user using the first application;
comparing the thread pattern of the first user using the first application to a learned thread pattern of a second user using the first application;
comparing a thread pattern of a first operating system to a learned thread pattern of the first operating system;
comparing a thread pattern of a first container running the first application to a learned thread pattern of a second container running the first application;
comparing a thread pattern of the first operating system running the first container running the first application to a learned thread pattern of the first operating system running the first container running the first application;
comparing a thread pattern of a first hypervisor running a first virtual machine to a learned thread pattern of a second hypervisor running the first virtual machine;
comparing a thread pattern of the first virtual machine running the first application to a learned thread pattern of a second virtual machine running the first application;
comparing a thread pattern of the first virtual machine running the first application to a learned thread pattern of the first virtual machine running the first application;
comparing a user session thread pattern of the first user using a plurality of applications to a learned session thread pattern of the first user using the plurality of applications; and
comparing a user session thread pattern of the first user using a plurality of applications to a learned session thread pattern of the second user using the plurality of applications.

3. The system of claim 1, wherein the learned thread pattern is a composite learned thread pattern and wherein the composite learned thread pattern comprises at least one of:
a composite learned thread pattern between a plurality of communication systems;
a composite learned thread pattern of an operating system and an application;
a composite learned thread pattern of the operating system and a hypervisor;
a composite learned thread pattern of the operating system, the hypervisor, and a container;
a composite learned thread pattern of the operating system, the hypervisor, the container, and the application; and
a composite learned thread pattern of a virtual machine and the application.

4. The system of claim 1, wherein comparing the thread pattern to the learned thread pattern is completed using a Graph Neural Network.

5. The system of claim 1, wherein identifying the anomaly in the thread pattern based on the variance from the learned thread pattern comprises looking at associated thread information comprising at least one of:
  a function call used to start a thread in the thread pattern;
  a stack size when the thread in the thread pattern was used;
  a heap size when the thread in the thread pattern was used;
  a memory usage when the thread in the thread pattern was used;
  a timestamp when the thread in the thread pattern was used;
  a time period when the thread in the thread pattern was used;
  a load on a resource; and
  other concurrently running applications.

6. The system of claim 1, wherein the thread pattern comprises a plurality of thread patterns of a plurality of users and wherein identifying the anomaly in the thread pattern based on the variance from the learned thread pattern comprises: identifying a plurality of anomalies based on the plurality of thread patterns of the plurality of users, and wherein the plurality of anomalies are used to identify a group attack.

7. The system of claim 1, wherein taking the action based on the anomaly in the thread pattern comprises one or more of: blocking one or more threads, notify a user, shutting down a container, shutting down an application, shutting down a virtual machine, quarantining an application, and restricting a resource.

8. The system of claim 1, wherein the machine readable and executable instructions further cause the microprocessor to:
  detect a legitimate change in code in at least one of an application, an operating system, a hypervisor, a container, a virtual machine, and a library; and
  in response to detecting the legitimate change in the code in at least one of the application, the operating system, the hypervisor, the container, the virtual machine, and the library, use machine learning to generate a new learned thread pattern.

9. The system of claim 1, wherein capturing the thread information generated by the one or more computing systems comprises capturing thread information for a plurality of computing systems on a plurality of networks and the capturing is done by a hierarchy of thread monitoring systems or a group of peer-to-peer thread monitoring systems.

10. A method comprising:
  capturing, by a microprocessor, thread information generated by one or more computing systems;
  identifying, by the microprocessor, a thread pattern from the captured thread information;
  comparing, by the microprocessor, the thread pattern to a learned thread pattern comprising comparing a user session thread pattern of a first user using a plurality of applications to a learned session thread pattern of the first user using the plurality of applications and wherein machine learning is used to filter out variances that have a similar usage pattern, but in a different order;
  identifying, by the microprocessor, an anomaly in the thread pattern based on a variance from the learned thread pattern; and
  in response to identifying the anomaly in the thread pattern, taking an action based on the anomaly in the thread pattern.

11. The method of claim 10, wherein comparing the thread pattern to the learned thread pattern comprises at least one of:
  comparing a thread pattern of the first user using a first application to a learned thread pattern of the first user using the first application;
  comparing the thread pattern of the first user using the first application to a learned thread pattern of a second user using the first application;
  comparing a thread pattern of a first operating system to a learned thread pattern of the first operating system;
  comparing a thread pattern of a first container running the first application to a learned thread pattern of a second container running the first application;
  comparing a thread pattern of the first operating system running the first container running the first application to a learned thread pattern of the first operating system running the first container running the first application;
  comparing a thread pattern of a first hypervisor running a first virtual machine to a learned thread pattern of a second hypervisor running the first virtual machine;
  comparing a thread pattern of the first virtual machine running the first application to a learned thread pattern of a second virtual machine running the first application;
  comparing a thread pattern of the first virtual machine running the first application to a learned thread pattern of the first virtual machine running the first application;
  comparing the user session thread pattern of the first user using a plurality of applications to a learned session thread pattern of the first user using the plurality of applications; and
  comparing the user session thread pattern of the first user using a plurality of applications to a learned session thread pattern of the second user using the plurality of applications.

12. The method of claim 10, wherein the learned thread pattern is a composite learned thread pattern and wherein the composite learned thread pattern comprises at least one of:
  a composite learned thread pattern between a plurality of communication systems;
  a composite learned thread pattern of an operating system and an application;
  a composite learned thread pattern of the operating system and a hypervisor;
  a composite learned thread pattern of the operating system, the hypervisor, and a container;
  a composite learned thread pattern of the operating system, the hypervisor, the container, and the application; and
  a composite learned thread pattern of a virtual machine and the application.

13. The method of claim 10, wherein comparing the thread pattern to the learned thread pattern is completed using a Graph Neural Network.

14. The method of claim 10, wherein identifying the anomaly in the thread pattern based on the variance from the learned thread pattern comprises looking at associated thread information comprising at least one of:
  a function call used to start a thread in the thread pattern;
  a stack size when the thread in the thread pattern was used;
  a heap size when the thread in the thread pattern was used;
  a memory usage when the thread in the thread pattern was used;
  a timestamp when the thread in the thread pattern was used;

a time period when the thread in the thread pattern was used;
a load on a resource; and
other concurrently running applications.

15. The method of claim 10, wherein the thread pattern comprises a plurality of thread patterns of a plurality of users and wherein identifying the anomaly in the thread pattern based on the variance from the learned thread pattern comprises: identifying a plurality of anomalies based on the plurality of thread patterns of the plurality of users, and wherein the plurality of anomalies are used to identify a group attack.

16. The method of claim 10, wherein taking the action based on the anomaly in the thread pattern comprises one or more of: blocking one or more threads, notify a user, shutting down a container, shutting down an application, shutting down a virtual machine, quarantining an application, and a restricting resource.

17. The method of claim 10, further comprising:
detecting a change in legitimate code in at least one of an application, an operating system, a hypervisor, a container, a virtual machine, and a library; and
in response to detecting the change in the legitimate code in at least one of the application, the operating system, the hypervisor, the container, the virtual machine, and the library, using machine learning to generate a new learned thread pattern.

18. A system comprising:
a microprocessor; and
a computer readable medium, coupled with the microprocessor and comprising microprocessor readable and executable instructions that, when executed by the microprocessor, cause the microprocessor to:
capture first thread information generated by at least one of a first operating system, a first hypervisor, a first container, and a first virtual machine;
capture second thread information generated by at least one of a second operating system, a second hypervisor, a second container, and a second virtual machine;
create a first thread pattern based on the first thread information;
create a second thread pattern based on the second thread information;
compare the first thread pattern to the second thread pattern comprising comparing a user session thread pattern of a first user using a plurality of applications to a learned session thread pattern of the first user using the plurality of applications and wherein machine learning is used to filter out variances that have a similar usage pattern, but in a different order;
identify an anomaly in the first thread pattern based on a variance from the second thread pattern; and
in response to identifying the anomaly in the first thread pattern based on the variance from the second thread pattern, taking an action.

19. The system of claim 18, wherein comparing the user session thread pattern to the learned session thread pattern is completed using a Graph Neural Network.

20. The system of claim 18, wherein identifying the anomaly in the first thread pattern based on the variance from the learned session thread pattern comprises looking at associated thread information comprising at least one of:
a function call used to start a thread in the first thread pattern;
a stack size when the thread in the first thread pattern was used;
a heap size when the thread in the first thread pattern was used;
a memory usage when the thread in the first thread pattern was used;
a timestamp when the thread in the first thread pattern was used;
a time period when the thread in the first thread pattern was used;
a load on a resource; and
other concurrently running applications.

* * * * *